United States Patent [19]

Suzuki

[11] Patent Number: 5,654,826
[45] Date of Patent: Aug. 5, 1997

[54] ZOOM LENS SYSTEM HAVING A VIBRATION REDUCTION FUNCTION

[75] Inventor: Kenzaburo Suzuki, Yokohama, Japan

[73] Assignee: Nikon Corporation, Tokyo, Japan

[21] Appl. No.: 614,692

[22] Filed: Mar. 13, 1996

[30] Foreign Application Priority Data

Apr. 4, 1995 [JP] Japan .................................. 7-103052

[51] Int. Cl.$^6$ .......................... G02B 27/64; G02B 15/14; G02B 9/00
[52] U.S. Cl. .......................... 359/557; 359/687; 359/690; 359/685; 359/740
[58] Field of Search .................................. 359/690, 687, 359/683, 740, 685, 554, 557

[56] References Cited

U.S. PATENT DOCUMENTS

| | | | |
|---|---|---|---|
| 4,844,602 | 7/1989 | Kitagishi et al. | 359/557 |
| 4,907,868 | 3/1990 | Kitagishi et al. | 359/557 |
| 4,929,069 | 5/1990 | Shibayama | 359/692 |
| 4,974,950 | 12/1990 | Yamazaki et al. | 359/557 |
| 4,978,205 | 12/1990 | Sato | 359/677 |
| 4,986,643 | 1/1991 | Moriyama | 359/693 |
| 5,000,549 | 3/1991 | Yamazaki | 359/691 |
| 5,039,211 | 8/1991 | Maruyama | 359/557 |
| 5,082,360 | 1/1992 | Sato et al. | 359/692 |
| 5,182,673 | 1/1993 | Kikuchi et al. | 359/691 |
| 5,270,857 | 12/1993 | Oizumi et al. | 359/554 |
| 5,337,098 | 8/1994 | Imafuji et al. | 354/70 |
| 5,402,197 | 3/1995 | Okano et al. | 354/410 |
| 5,416,558 | 5/1995 | Katayama et al. | 354/446 |
| 5,502,594 | 3/1996 | Suzuki et al. | 359/764 |
| 5,530,589 | 6/1996 | Sato | 359/557 |
| 5,530,594 | 6/1996 | Shibayama | 359/690 |
| 5,559,635 | 9/1996 | Sato | 359/689 |
| 5,579,171 | 11/1996 | Suzuki et al. | 359/687 |
| 5,585,966 | 12/1996 | Suzuki | 359/554 |
| 5,606,456 | 2/1997 | Nagata et al. | 359/683 |

FOREIGN PATENT DOCUMENTS

| | | |
|---|---|---|
| 655 638 | 5/1995 | European Pat. Off. . |
| A-57-169716 | 10/1982 | Japan . |
| A-60-188918 | 9/1985 | Japan . |
| A-62-75412 | 4/1987 | Japan . |
| A-63-157120 | 6/1988 | Japan . |
| A-3-141313 | 6/1991 | Japan . |
| 5-224160 | 9/1993 | Japan . |
| A-6-130291 | 5/1994 | Japan . |
| A-6-265788 | 9/1994 | Japan . |

*Primary Examiner*—Georgia Y. Epps
*Assistant Examiner*—Evelyn A. Lester
*Attorney, Agent, or Firm*—Oliff & Berridge

[57] ABSTRACT

A high performance zoom lens system is provided capable of driving a vibration reduction lens group while securing sufficient brightness (small F-number) and sufficient back focal length. The zoom lens system includes a first lens group G1 of positive refractive power, a second lens group G2 of negative refractive power and a last lens group GL of positive refractive power. An interval between the first lens group G1 and the second lens group G2 increases and an interval between the second lens group G2 and the last lens group varies during zooming from a maximum wide-angle state to a maximum telephoto state. The last lens group GL includes a first lens subgroup GL1 of positive refractive power, a second lens subgroup GL2 of positive refractive power and a third lens subgroup GL3 of either positive or negative refractive power. A displacement device prevents vibration by moving the second lens subgroup GL2 in a direction substantially perpendicular to the optical axis.

20 Claims, 9 Drawing Sheets

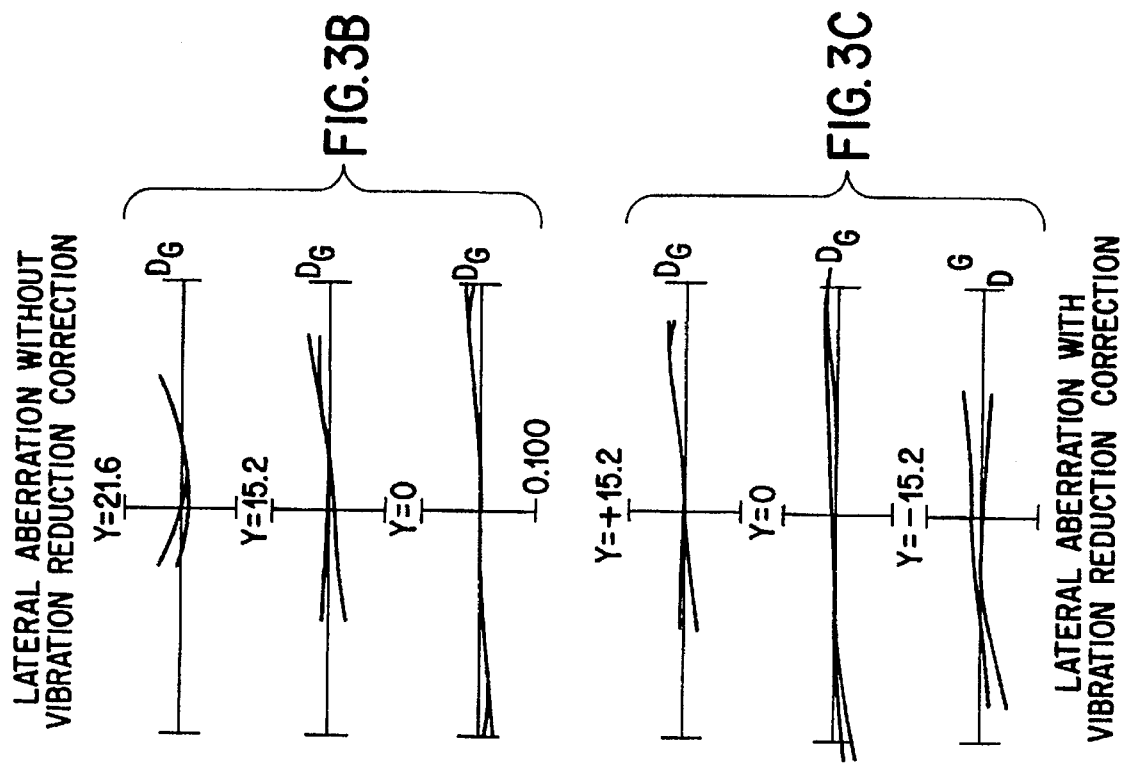
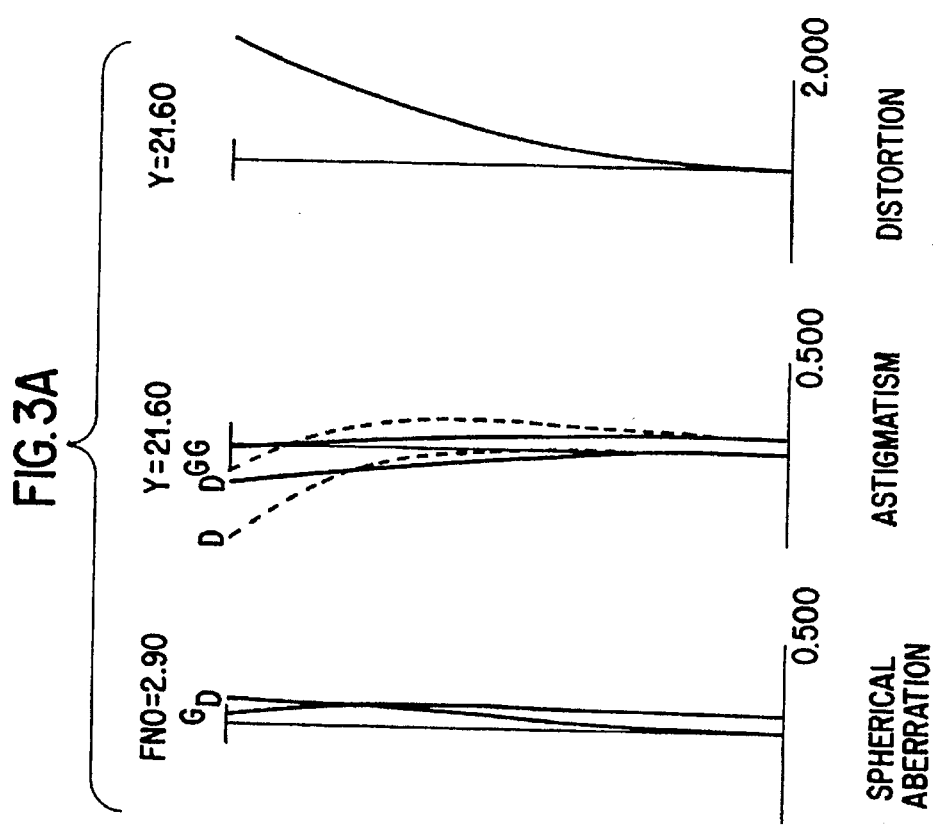

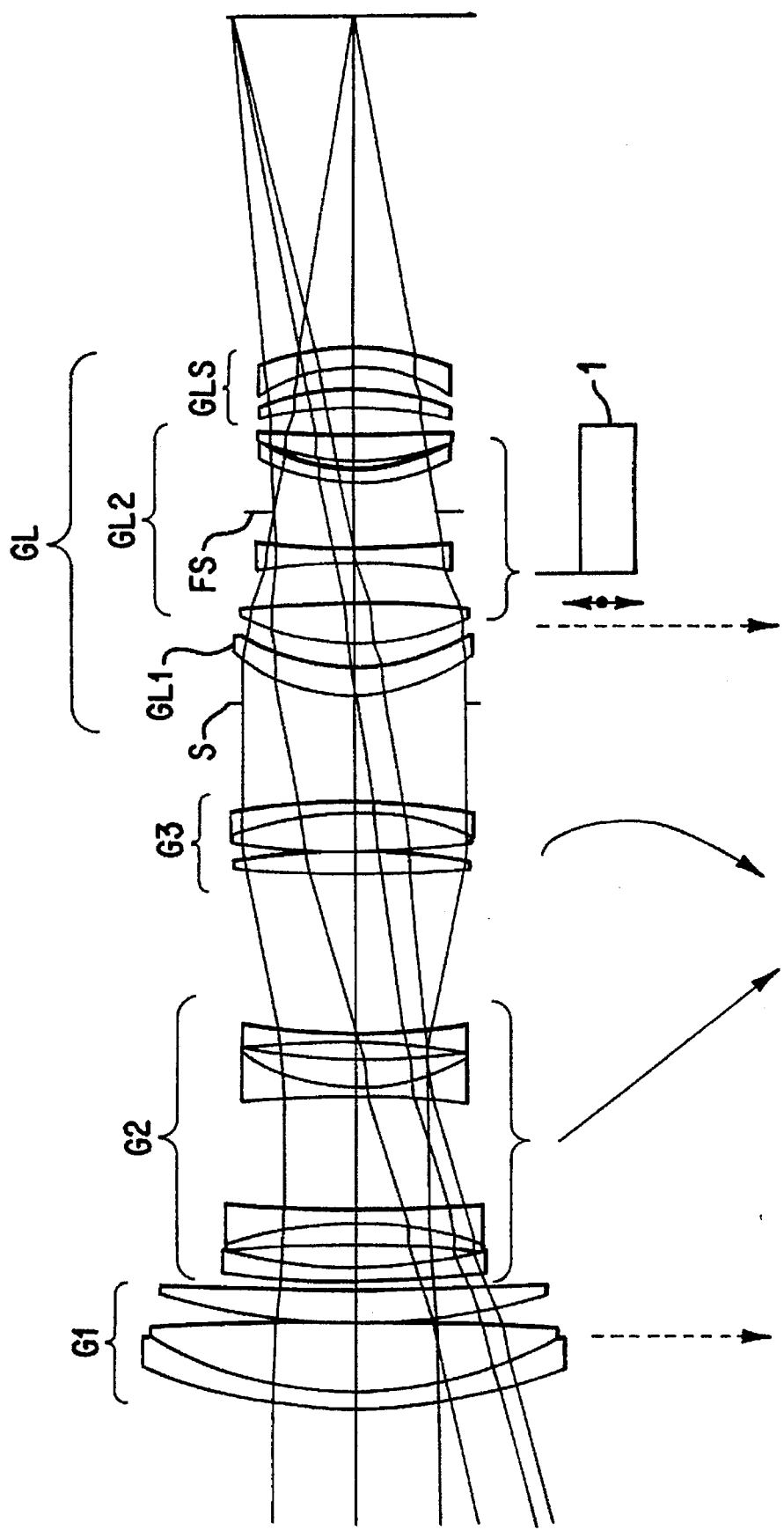

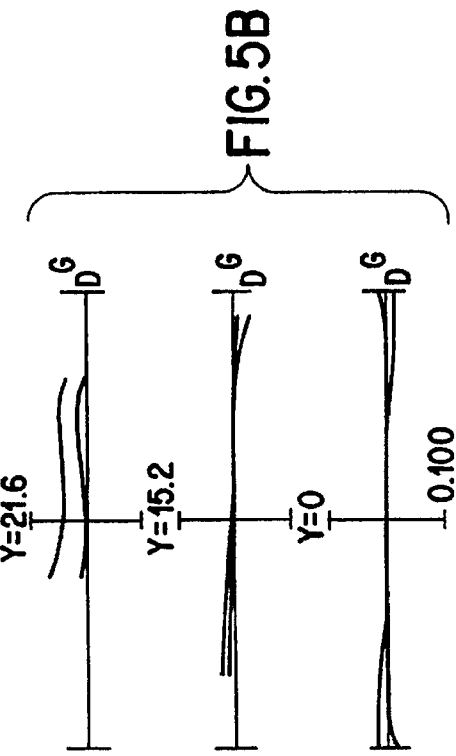
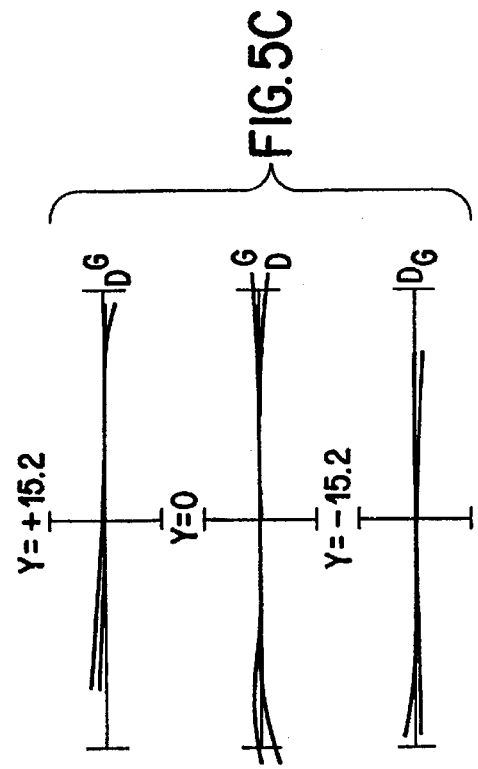

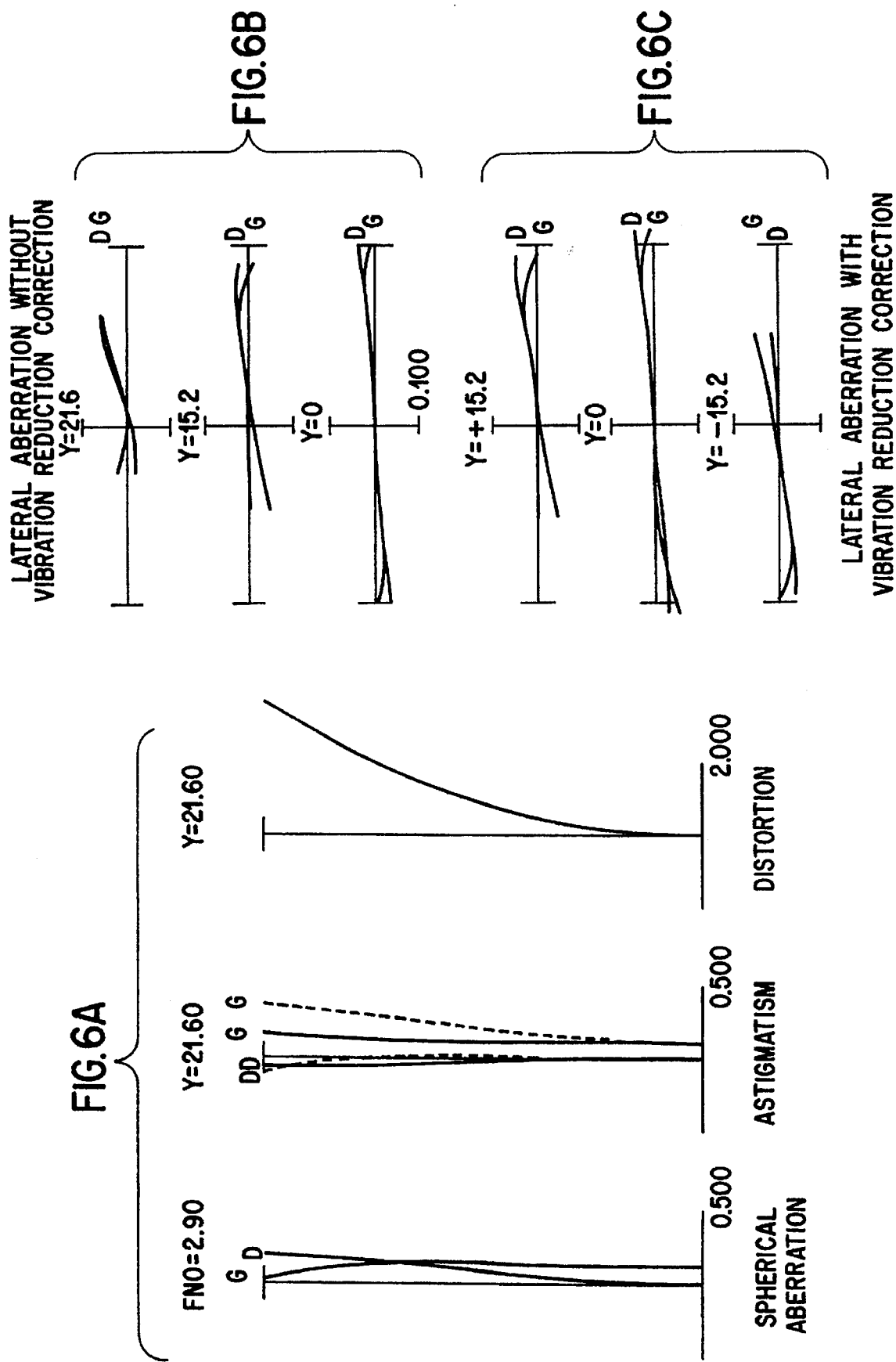

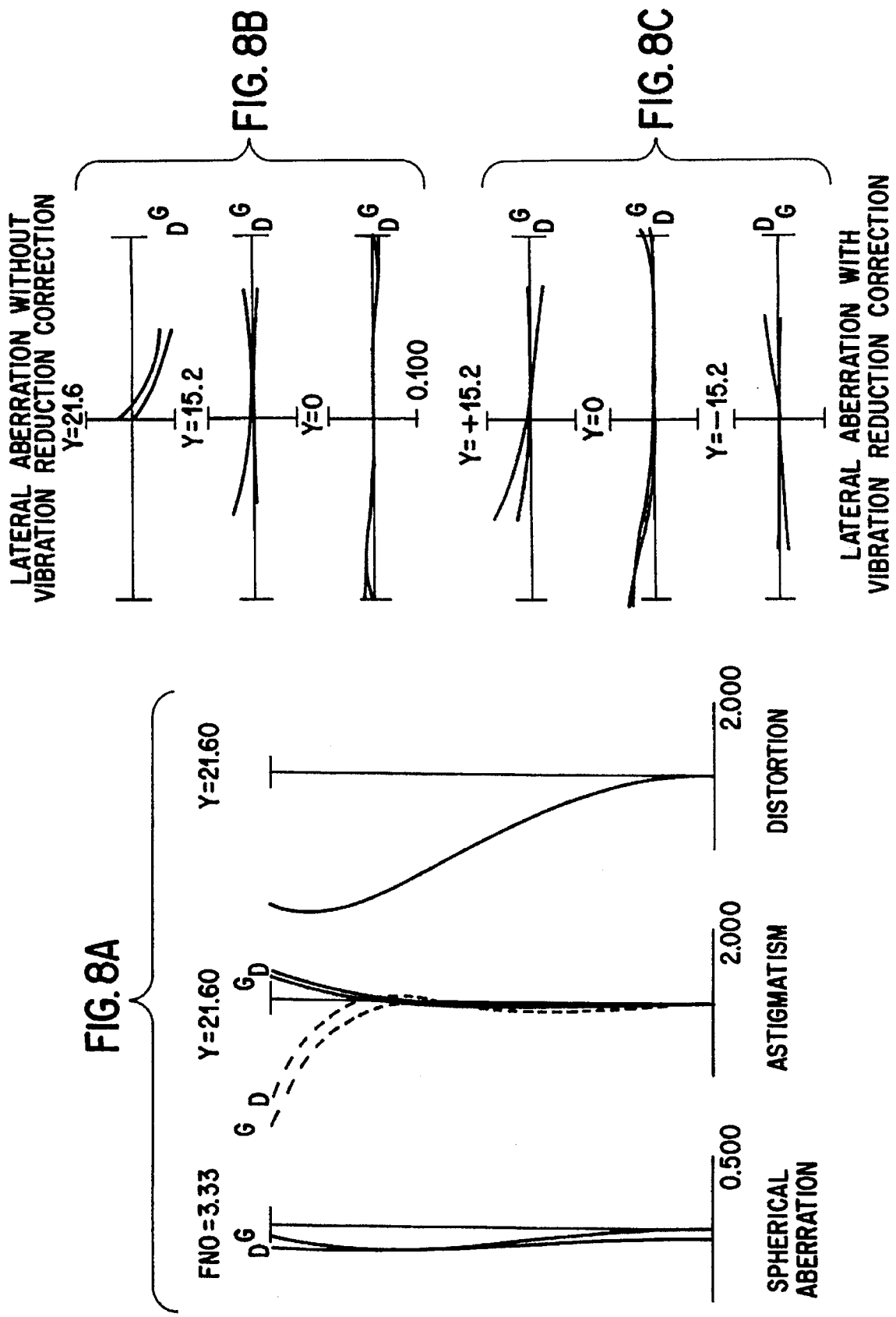

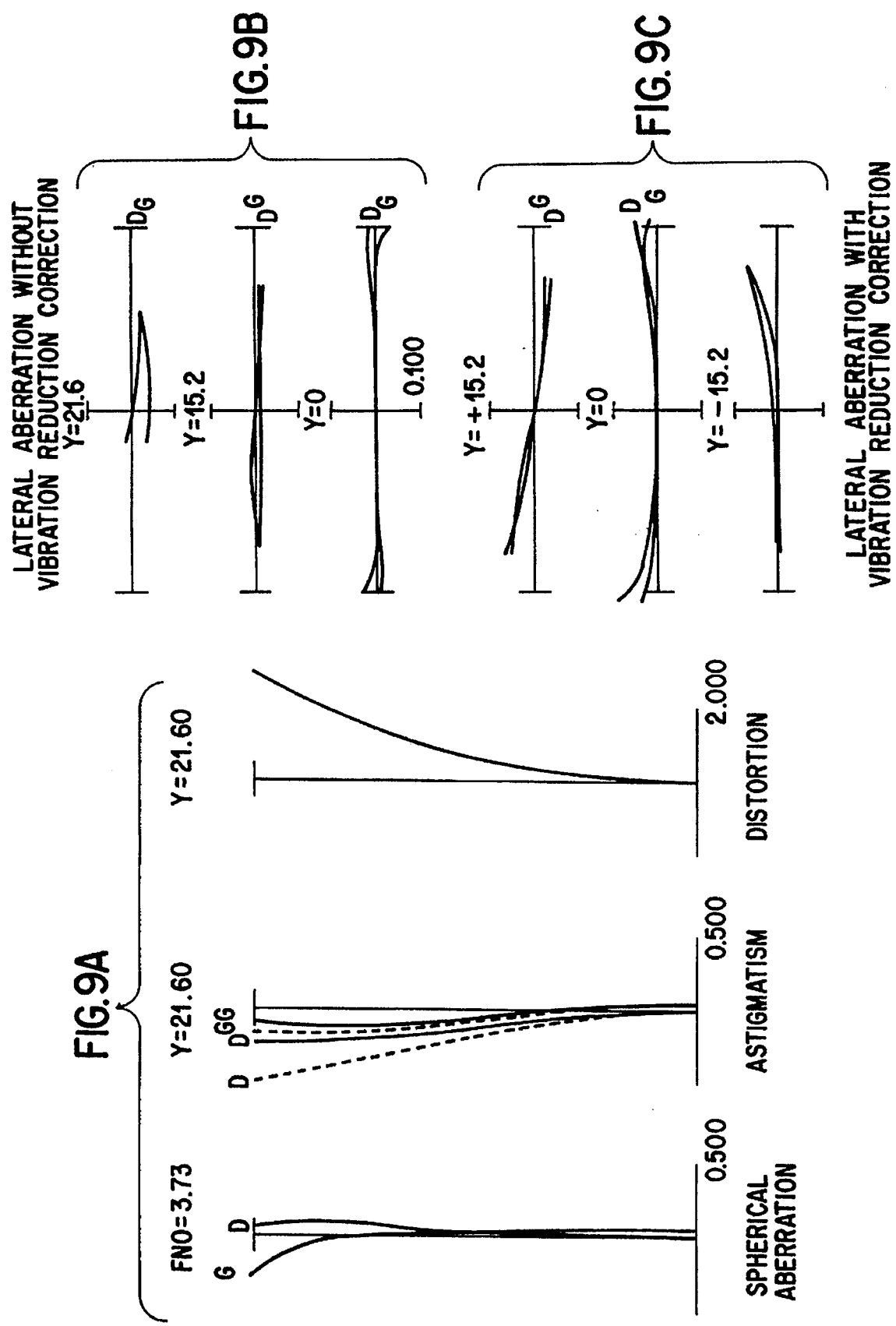

ZOOM LENS SYSTEM HAVING A VIBRATION REDUCTION FUNCTION

BACKGROUND OF THE INVENTION

1. Field of the Invention

The present invention relates to a zoom lens system having a vibration reduction function. More particularly, the present invention relates to vibration reduction for zoom lenses used in photographing cameras and video cameras.

2. Description of Related Art

An example of a conventional zoom lens system having a vibration reduction function is disclosed in U.S. Pat. No. 5,270,857, the subject matter of which is incorporated herein by reference. In this zoom lens system, vibration reduction correction is performed by displacing the entire or part of the lens group that moves during zooming in a direction perpendicular to the optical axis.

"Vibration reduction" refers to a process of correcting variations of image positions caused by shaking of the hand through movement of the lens group in a direction substantially perpendicular to the optical axis. "Vibration Reduction" causes a result of "image stabilizing."

However, in the above-described conventional zoom lens system having the vibration reduction function, the lens group that moves in the direction perpendicular to the optical axis also moves along the optical axis during zooming. Hence, problems occur because of the complexity of the mechanism for driving the vibration reduction lens group. The F-number becomes large to about 3.5–5.6 while the back focal length for a single lens reflex camera cannot be achieved.

SUMMARY OF THE INVENTION

The present invention provides a high performance zoom lens system capable of driving the vibration reduction lens group with a simple mechanism and securing sufficient brightness (small F-number) and adequate back focal length.

The present invention provides a zoom lens system having a vibration reduction function. The zoom lens system includes a first lens group G1 of positive refractive power closest to the object side, a second lens group G2 of negative refractive power on the image side of the first lens group G1 and a last lens group GL of positive refractive power on the image side of the second lens group. The interval between the first lens group G1 and the second lens group G2 increases and the interval between the second lens group G2 and the last lens group varies during zooming from the maximum wide-angle state to the maximum telephoto state. The last lens group GL includes, in order from the object side, a first lens subgroup GL1 of positive refractive power, a second lens subgroup GL2 of positive refractive power and a third lens subgroup GL3 of either positive or negative refractive power. The zoom lens system also includes a displacement device to prevent vibration by moving the second lens subgroup GL2 in a direction substantially perpendicular to the optical axis. In one embodiment, a third lens group G3 of positive refractive power is located between the second lens group G2 and the last lens group GL.

The present invention preferably satisfy the following Equations:

$$0.2 < fL2/fL < 8 \quad (1)$$

$$0.05 < fL2/f1 < 5.0 \quad (2)$$

where fl1 is the focal length of the lens group GL1, fL2 is the focal length of the lens group GL2 and fL is the focal length of the last lens group GL.

The present invention includes, in order from the object side, a first lens group G1 of positive refractive power, a second lens group G2 of negative refractive power and a last lens group GL of positive refractive power closest to the image side in order to function well as a zoom lens system for use in photographic cameras and video cameras. The present invention also has a structure such that the interval between the first lens group G1 and the second lens group G2 increases during zooming from the maximum wide-angle state to the maximum telephoto state and the interval between the second lens group G2 and its image side lens group varies non-linearly.

The characteristics of a zoom lens system having a basic structure as described above will now be explained.

Zoom lens systems are known to include three lens groups, in order from the object side, a first lens group G1 of positive refractive power, a second lens group G2 of negative refractive power and a last lens group GL of positive refractive power placed closest to the image side.

If a third lens group G3 of positive refractive power is added on the image side of the second lens group G2, a bright zoom lens system is obtained having a small F-number and large zoom ratio to achieve favorable imaging performance for each focal length state. For example, a photograph-use zoom lens system having the above structure and an F-number of about 2.8 is known in the art.

The above-mentioned zoom lens system is used as a photographic zoom lens system and video camera zoom lens system.

However, in a zoom lens system according to the present invention, the last lens group GL includes, in order from the object side, a first lens subgroup GL1 of positive refractive power, a second lens subgroup GL2 of positive refractive power and a third lens subgroup GL3 of either positive or negative refractive power. Moreover, vibration reduction operation is performed by moving the second lens subgroup GL2 in a direction substantially perpendicular to the optical axis. Hence, a vibration reduction lens group is formed to obtain a high performance zoom lens system capable of securing sufficient brightness (f-number) and adequate back focal length.

In a zoom lens system where a lens group of positive refractive power precedes the other lens groups, the first lens group G1 closest to the object side becomes the largest. Thus, a maintenance/driving device for moving the first lens group G1 perpendicular to the optical axis for vibration reduction is undesirably large.

Therefore, it is generally desirable to make the first lens group G1 a vibration reduction correction optical system. Moreover, if the second lens group provides the vibration reduction function, then the maintenance/driving mechanism may be undesirably complicated.

Hence, in the present invention the vibration reduction operation is performed by moving the second lens subgroup GL2 in a direction substantially perpendicular to the optical axis to secure favorable aberration characteristics.

In order to perform vibration reduction without changing the image quality between the center and the perimeter sections, an aperture stop is preferably placed close to the vibration reduction second lens subgroup GL2.

Moreover, because the first lens subgroup GL1 of positive refractive power is placed on the object side of the vibration reduction second lens subgroup GL2, a diameter of the lens positioned on the image side of the vibration reduction lens group GL2 can be made smaller.

Furthermore, the vibration reduction second lens subgroup GL2 and the aperture stop are preferably fixed during zooming along the optical axis to simplify the maintenance/driving device. Alternatively, the interval between the front and rear of the vibration reduction second lens subgroup GL2 is constant during zooming.

Moreover, when the vibration reduction second lens subgroup GL2 moves perpendicularly to the optical axis, light rays in the marginal zone away from the optical axis may enter the lens group behind the vibration reduction second lens subgroup GL2 as undesired light rays. Undesired light causes ghost, unnecessary exposure and the like. Hence, in order to avoid the incidence of such harmful light, a flare stop (different from the aperture stop) may be fixed relative to the optical axis.

The present invention preferably satisfies the following Equations (1) and (2):

$$0.2 < fL2/fL < 8 \quad (1)$$

$$0.05 < fL2/f1 < 5.0 \quad (2)$$

where, f1: focal length of the first lens subgroup GL1, fL2: focal length of the vibration reduction second lens subgroup GL2, and fL: focal length of the last lens group GL.

Equation (1) defines an appropriate range for the ratio of the focal length fL2 of the second lens subgroup GL2 and the focal length fL of the last lens group GL.

When the upper limit of Equation (1) is exceeded, the focal length of the second lens subgroup GL2 becomes large causing a large movement of the second lens subgroup GL2 in the direction perpendicular to the optical axis to correct the specified movement amount. As a result, in order to prevent shielding of light rays during movement of the second lens subgroup GL2, the diameter of the second lens subgroup GL2 is made large. Also, the total length of the zoom lens system becomes inconveniently long.

On the other hand, when the lower limit of Equation (1) is breached, the focal length of the second lens subgroup GL2 becomes too small, causing the spherical aberration to become too large during zooming.

Here, the upper limit and the lower limit of Equation (1) may be preferably changed to 2.5 and 0.5, respectively, in order to obtain even better imaging quality.

Equation (2) defines an appropriate range for the ratio of the focal length fL2 of the second lens subgroup GL2 to the focal length f1 of the first lens subgroup GL1. This condition achieves favorable imaging performance including vibration reduction capability in forming the last lens group GL.

If the upper limit of Equation (2) is exceeded, the spherical aberration becomes too large. Moreover, the total length of the zoom lens system becomes too long, which is contrary to an object of the present invention of miniaturizing the zoom lens system. Moreover, in addition to the Petzval sum becoming too large in the positive, the astigmatic difference and bending in the image plane become large making it impossible to obtain favorable imaging performance.

On the contrary, if the lower limit of Equation (2) is breached, it is difficult to sufficiently secure large back focal length. Thus, such a small fL2/f1 value is undesirable.

Moreover, the spherical aberration easily becomes too large in the negative and undesirable positive coma aberration is easily produced in the light rays above the chief ray.

The upper limit and lower limit of Equation (2) may be preferably changed to 1.5 and 0.2, respectively, to obtain better imaging performance.

The following Equations (3)–(5) are preferably also satisfied.

$$\Delta SL/fL2 < 0.1 \quad (3)$$

$$-15.0 < RL/fL2 < 15.0 \quad (4)$$

$$L/fL < 0.6 \quad (5)$$

where,

ΔSL: magnitude of the maximum displacement of the second lens subgroup GL2 in the direction perpendicular to the optical axis during vibration reduction operation, RL: radius of curvature of the surface closest to the image side in the second lens subgroup GL2, and L: axial thickness of the second lens subgroup GL2.

The axial thickness of the second lens subgroup GL2 is a distance between a surface closest to the object side and a surface closest to the image side.

Equation (3) defines an appropriate range for the ratio of the focal length of the second lens subgroup GL2 to the magnitude of the maximum displacement amount of the second lens subgroup GL2 during vibration reduction operation.

If the upper limit of Equation (3) is exceeded, the magnitude of the maximum displacement amount of the second lens subgroup GL2 is large causing the aberration vibration amount to become too large during vibration reduction operation.

In particular, in a marginal position on the image plane, a difference between the best image plane in the meridional direction and the best image plane in the sagittal direction becomes inconveniently large. In addition, the driving mechanism becomes complicated. Thus, a small value of ΔSL/fL2 is undesirable.

The upper limit of Equation (3) may be preferably changed to 0.03 to obtain even better imaging performance.

Equation (4) defines an appropriate range for the ratio of the focal length fL2 to the radius of curvature of the surface closest to the image plane of the second lens subgroup GL2.

When the upper limit is exceeded or the lower limit is breached in Equation (4), variations of the spherical aberration and field curvature become too large during zooming. In addition, variations of the spherical aberration and coma aberration also become too large during the vibration reduction operation making it inconvenient and difficult for aberration correction.

Thus, the upper limit and the lower limit value of Equation (4) may be changed to 5.5 and −6.0, respectively, to obtain even better imaging performance.

Equation (5) defines an appropriate range for the ratio of the focal length of the last lens group GL to the axial thickness of the second lens subgroup GL2.

If the upper limit of Equation (5) is exceeded, the axial thickness of the second lens subgroup GL2 is too large causing the second lens subgroup GL2 to be bulky. As a result, the total length of the zoom lens system is too large and the vibration reduction mechanism is inconveniently complicated.

In forming the second lens subgroup GL2, the following Equations (6) and (7) are preferably satisfied.

$$-4.5 < q+ < 5.0 \quad (6)$$

$$-4.0 < q- < 5.0 \quad (7)$$

where, q+: shape factor of the positive lens element in the vibration reduction lens group closest to the object side; and q−: shape factor of the negative lens element in the vibration reduction lens group closest to the image side.

The shape factor of the lens element is expressed by the following Equation.

$$q=(R2+R1)/(R2-R1)$$

where,

R1: radius of curvature of the object side surface of the lens element; and

R2: radius of curvature of the image side surface of the lens element.

When the upper limit of Equation (6) is exceeded, the spherical aberration is extremely large in the negative direction and coma aberration facing inward is too large. Thus, a large value of q+ is inconvenient.

If the lower limit of Equation (6) is breached, the spherical aberration is extremely large in the negative direction and astigmatism is too large. Thus, a small value of q+ is inconvenient.

The upper limit and lower limit of Equation (6) may be changed to 2.0 and −1.5, respectively, to obtain better imaging performance.

When the upper limit of Equation (7) is exceeded, the spherical aberration is extremely large in the positive direction and the spherical aberration and the coma aberration are too large during vibration reduction operation. Thus, a large value of q− is undesirable.

If the lower limit of Equation (7) is breached, the spherical aberration is extremely large in the positive direction and the spherical aberration and coma aberration are too large during vibration reduction operation. Thus, a small value of q− is undesirable.

The upper limit and lower limit of Equation (7) may be changed to 2.0 and 0, respectively, to obtain better imaging performance.

When a third lens group G3 of positive refractive power is placed between the second lens group G2 and the last lens group GL, the following Equations (8) and (9) are preferably satisfied to obtain even better imaging performance.

$$0.15<|f2|/f1<0.45 \quad (8)$$
$$0.35<f3/f1<1.3 \quad (9)$$

where, f1: focal length of the first lens group G1, f2: focal length of the second lens group G2, and f3: focal length of the third lens group G3.

When the upper limit of Equation (8) is exceeded, the spherical aberration at the maximum telephoto state is extremely large in the negative direction and the variation of the coma aberration is too large. Thus, a large value of $|f2|/f1$ is undesirable.

If a lower limit of Equation (8) is breached, the astigmatic difference at the maximum wide-angle state is too large causing distortion between the maximum wide-angle state and the maximum telephoto state to shift substantially in the negative direction. In addition, the Petzval sum is easily converted to the negative side. Thus, a small value of $|f2|/f1$ is undesirable.

If the upper limit of Equation (9) is exceeded, variations of the coma aberration are too large and the total length of the zoom lens system is too long. Thus, a large value of f3/f1 is undesirable.

If the lower limit of Equation (9) is breached, the spherical aberration is too large in the negative direction and the Petzval sum is easily converted to the negative side. Thus, a small value of f3/f1 is undesirable.

If the zoom lens includes the first lens group G1, the second lens group G2 and the last lens group GL, the first lens group G1 and the last lens group GL are preferably moved to perform zooming in accordance with the present invention. Thus, a compact optical system is produced, especially at the maximum wide-angle state, while obtaining favorable imaging performance.

If the zoom lens system includes the first lens group G1, the second lens group G2, the third lens group G3 and the last lens group GL, the first lens group G1 and the last lens group GL are preferably fixed so that the second lens group G2 and the third lens group G3 are moved to perform zooming. In such structure, a driving mechanism for zooming and vibration reduction can be simplified while obtaining favorable imaging performance.

The third lens subgroup GL3 closest to the image side may be of positive or negative refractive power. However, if the total length of the zoom lens system is desired to be shorter or if the exit pupil is desired to be close to the image side, the third lens subgroup GL3 is preferably of positive refractive power. On the other hand, if distortion is desired to be balanced on the negative side (desired to be corrected on the negative side) or if the exit pupil is desired to be away from the image plane, it is more effective if the third lens subgroup GL3 is of negative refractive power. Moreover, if the third lens subgroup GL3 is of negative refractive power, the focal length fL3 of the third lens subgroup GL3 preferably satisfies the following Equation (10):

$$0.5<|fL3|/fL<8 \quad (10)$$

The refractive index N+ of the positive lens element closest to the object side in the second lens subgroup GL2 relative to d-line ($\lambda$=587.6 nm) and the Abbe's number v+ of the positive lens element closest to the second lens subgroup GL2 preferably satisfy the following Equations (11) and (12) to obtain favorable imaging performance.

$$N+>1.47 \quad (11)$$
$$v+>45 \quad (12)$$

When the first lens subgroup GL1 is one lens (including cemented lens), the lens is desirably a positive meniscus lens with the convex surface facing the object side.

Moreover, when the second lens subgroup GL2 is one lens (including cemented lens), the lens is desirably a positive lens of glass with an Abbe's number no less than 55.

When the second lens subgroup GL2 includes two lenses (including cemented lens), one of the lenses is a positive lens and the other is a negative meniscus lens having a convex surface with stronger curvature facing the image side.

When the second lens subgroup GL2 includes three lenses (including cemented lens), the three lenses include a biconvex lens, a biconcave lens and a positive lens.

When the second lens subgroup GL2 includes four lenses (including cemented lens), the four lenses include a biconvex lens, a biconcave lens, a negative meniscus lens and a positive lens.

The third lens group G3 may be of negative refractive power. Then, the third lens group G3 includes at least one positive lens element.

Moreover, better imaging performance is obtained by introducing a non-spherical surface to at least one of the lens surface of the optical system.

Even better imaging performance is obtained using a gradient index lens (GRIN lens) for at least one of the lenses within the optical system.

Internal focusing is possible for focusing on a close-distance object by moving a part of the lens group in the second lens group G2 along the optical axis.

Moreover, it is effective to use special low dispersion glass for one of the lens groups within the zoom lens system to satisfactorily correct chromatic aberration. Preferably, a special low dispersion glass is used in the first lens group G1 to result in satisfactory correction of chromatic aberration at the maximum telephoto state.

Other aspects, advantages and salient features of the invention will become apparent from the detailed description taken in conjunction with the annexed drawings, which disclose preferred embodiments of the invention.

BRIEF DESCRIPTION OF DRAWINGS

The invention will be described in detail with reference to the following drawings in which like reference numerals refer to like elements and wherein:

FIGS. 3A–3C show graphs of aberrations in a maximum telephoto state in the first embodiment;

FIG. 4 shows a zoom lens system according to a second embodiment;

FIGS. 5A–5C show graphs of aberrations in a maximum wide-angle state in the second embodiment;

FIGS. 6A–6C show graphs of aberrations in a maximum telephoto state in the second embodiment;

FIGS. 8A–8C show graphs of aberrations in a maximum wide-angle state in the third embodiment; and FIGS. 9A–9C show graphs of aberrations in a maximum telephoto state in the third embodiment.

DETAILED DESCRIPTION OF PREFERRED EMBODIMENTS

In the present specification, the term "lens group" designates a portion of the total lens system. Each lens group may include one lens or any greater number of lenses. Lens groups are also known as lens units.

In each embodiment of the present invention, the zoom lens system includes a vibration reduction function. The system includes a first lens group G1 of positive refractive power placed closest to the object side, a second lens group G2 of negative refractive power placed on the image side of the first lens group G1 and a last lens group GL of positive refractive power placed closest to the image side. The system includes a mechanism to increase the interval between the first lens group G1 and the second lens group G2 and vary the interval between the second lens group G2 and the lens group placed on the image side of the second lens group G2 during zooming from a maximum wide-angle state to a maximum telephoto state. The last lens group GL includes, in order from the object side, a first lens subgroup GL1 of positive refractive power, a second lens subgroup GL2 of positive refractive power and a third lens subgroup GL3 of either positive or negative refractive power. A displacement device is provided to prevent vibrations caused by moving the second lens subgroup GL2 in a direction substantially perpendicular to the optical axis. This type of displacement device can include an actuator and controller as disclosed in U.S. Pat. Nos. 5,416,558, 5,402,197 and 5,337,098, the subject matters of which are incorporated herein by reference and which are assigned to the same assignee as the present application.

Figure 1:
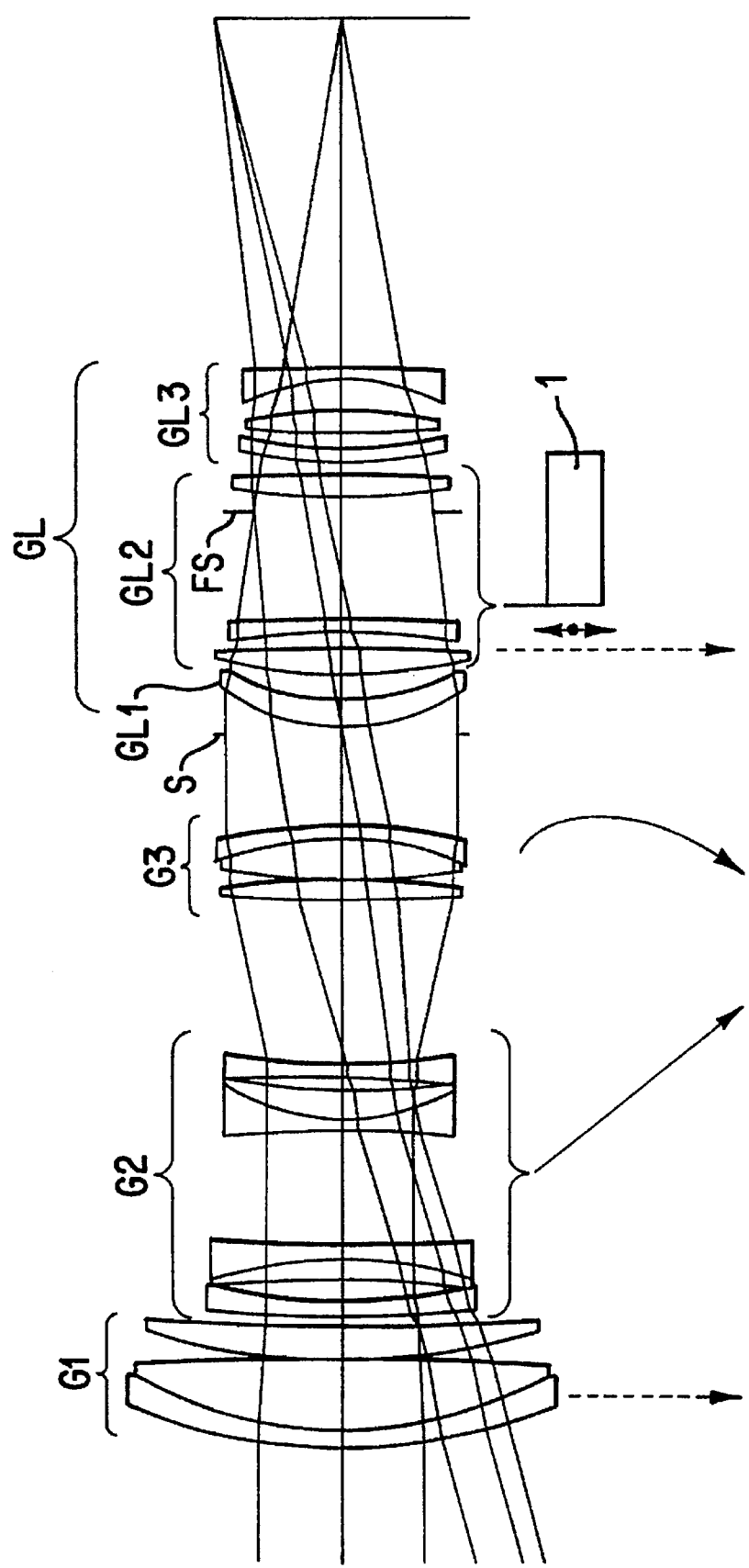
FIG. 1 shows a zoom lens system according to a first embodiment of the present invention.

FIG. 1 shows a zoom lens system according to a first embodiment. A first lens group G1 includes a cemented lens having a negative meniscus lens with the convex surface facing the object side, a biconvex lens and a positive meniscus lens with the convex surface facing the object side. A second lens group G2 includes a negative meniscus lens with the convex surface facing the object side, a cemented lens having a positive meniscus lens with the convex surface facing the object side and a biconcave lens, a cemented lens having a biconcave lens and a positive meniscus lens with the concave surface facing the object side, and a biconcave lens. A third lens group G3 includes a biconvex lens and a cemented lens having a biconvex lens and a negative meniscus lens with a concave surface facing the object side.

A first lens subgroup GL1 includes a positive meniscus lens with the convex surface facing the object side. A second lens subgroup GL2 includes a biconvex lens, a negative meniscus lens with the concave surface facing the object side and a biconvex lens. A third lens subgroup GL3 includes a negative meniscus lens with the convex surface facing the object side, a biconvex lens and a negative meniscus lens with the concave surface facing the object side.

An aperture stop S is provided between the third lens group G3 and the last lens group GL. A flare stop FS is also provided in the last lens group GL.

FIG. 1 shows the positional relationship of each lens group at the maximum wide-angle state. The second lens group G2 and the third lens group G3 move on the optical axis along the zoom path (described by arrows) when zooming to the maximum telephoto state. The first lens group G1 and the last lens group GL are fixed along the optical direction during zooming. The second lens subgroup GL2 is moved by a vibration reduction mechanism 1 in a direction substantially perpendicular to the optical axis to correct variations of the image position caused by vibrations of the zoom lens system.

The first embodiment is preferably for use with a telephoto zoom lens system.

Table 1 summarizes data values of the first embodiment of the present invention. In Table 1, f is the focal length, $F_{no}$ is the F-number, $2\omega$ is an angle of view and Bf is the back focal length. Numerals in the leftmost column represent the order of the lens surfaces from the object side, r denotes the radius of curvature of each lens surface, d denotes spacing of each lens, n(D) denotes the refractive index relative to a d-line ($\lambda$=587.6 nm), n(G) denotes the refractive index relative to a g-line ($\lambda$=435.8 nm) and $\nu$ denotes the Abbe's number with respect to the d-line.

TABLE 1 f = 81.5–196
$F_{no}$ = 2.88–2.90
$2\omega$ = 30.64°–12.24°

|   | r | d | ν | N(D) | n(G) |
|---|---|---|---|------|------|
| 1 | 105.5399 | 2.8000 | 25.50 | 1.804581 | 1.846310 |
| 2 | 73.4058 | 11.4000 | 82.52 | 1.497820 | 1.505265 |
| 3 | −570.0625 | 0.1000 | | | |
| 4 | 118.0775 | 5.7000 | 92.52 | 1.497820 | 1.505265 |
| 5 | 1042.0718 | (d5 = variable) | | | |
| 6 | 322.9129 | 2.1000 | 52.30 | 1.748099 | 1.765893 |
| 7 | 122.5766 | 3.8500 | | | |
| 8 | −118.7333 | 3.5000 | 25.50 | 1.804581 | 1.846310 |
| 9 | −61.4330 | 1.6000 | 60.69 | 1.563840 | 1.575310 |
| 10 | 262.6262 | (d10 = variable) | | | |

TABLE 1-continued f = 81.5–196
$F_{no}$ = 2.88–2.90
2ω = 30.64°–12.24°

| | r | d | ν | N(D) | n(G) |
|---|---|---|---|---|---|
| 11 | –119.9235 | 1.5000 | 61.09 | 1.589130 | 1.601033 |
| 12 | 42.1223 | 4.5000 | 25.50 | 1.804581 | 1.846310 |
| 13 | 118.0410 | 2.4000 | | | |
| 14 | –181.3955 | 1.8000 | 45.37 | 1.796681 | 1.818801 |
| 15 | 139.1660 | (d15 = variable) | | | |
| 16 | 302.2780 | 3.3000 | 46.42 | 1.582670 | 1.598584 |
| 17 | –143.1747 | 0.1000 | | | |
| 18 | 143.7170 | 6.9000 | 69.98 | 1.518601 | 1.527667 |
| 19 | –49.9410 | 1.6000 | 25.50 | 1.804581 | 1.846310 |
| 20 | –113.3388 | (d20 = variable) | | | |
| 21 | 36.6067 | 4.8468 | 82.52 | 1.497820 | 1.505265 |
| 22 | 46.2861 | 3.6289 | | | |
| 23 | 84.1217 | 4.3123 | 67.87 | 1.593189 | 1.604034 |
| 24 | –491.6227 | 2.8555 | | | |
| 25 | –111.2332 | 2.0000 | 28.56 | 1.795040 | 1.831518 |
| 26 | –420.6652 | 20.4975 | | | |
| 27 | 128.7233 | 3.2589 | 49.45 | 1.772789 | 1.792324 |
| 28 | –396.1270 | 2.5000 | | | |
| 29 | 97.5833 | 2.0000 | 25.50 | 1.804581 | 1.846310 |
| 30 | 80.2047 | 2.9334 | | | |
| 31 | 458.0063 | 3.2960 | 40.90 | 1.796310 | 1.821068 |
| 32 | –88.9133 | 5.2410 | | | |
| 33 | –37.5559 | 2.0000 | 49.45 | 1.772789 | 1.792324 |
| 34 | –199.2469 | (Bf) | | | |

| Variable Interval Upon Zooming | | |
|---|---|---|
| f | 81.45000 | 196.00000 |
| d5 | 1.92399 | 38.13447 |
| d10 | 19.63070 | 19.63070 |
| d15 | 27.22503 | 2.32353 |
| d20 | 16.70000 | 5.39102 |
| Bf | 57.98513 | 57.98513 |

PREFERRED VALUES CORRESPONDING TO EQUATIONS fL=109.486
fl1=301.461
fL2=97.565
fL3=–146.130
RL=–396.12698
L=32.9242
f1=125.913
f2=–33.163
f3=92.138
(1) fL2/fL=0.891
(2) fL2/fl1=0.324
(3) ΔSL/fL2=0.0103
(4) RL/fL2=–4.060
(5) L/fL=0.301
(6) q+=0.708
(7) q–=1.719
(8) |f2|/f1=0.263
(9) f3/f1=0.732
(10) |fL3|/fL=1.335
(11) N+=1.593189
(12) ν+=67.87

VIBRATION REDUCTION DATA

The maximum displacement amount ΔSL of the vibration reduction second lens subgroup GL2 in the direction perpendicular to the optical axis in the maximum wide-angle state . . . 1.0

Corresponding image movement amount ΔY in the maximum wide-angle state and the maximum telephoto state . . . +1.0

The positive sign indicates that the movement of the image stabilizing lens is in the same image direction.

Figure 2A:
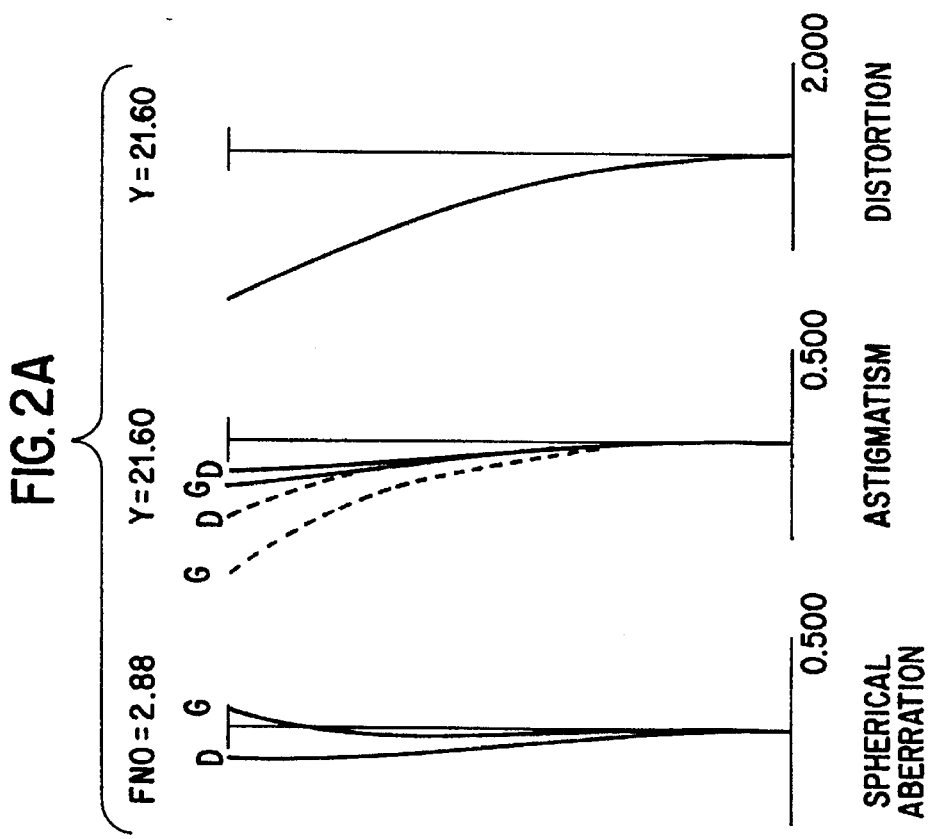
FIGS. 2A–2C show graphs of aberrations in a maximum wide-angle state in the first embodiment.
Figure 2B:
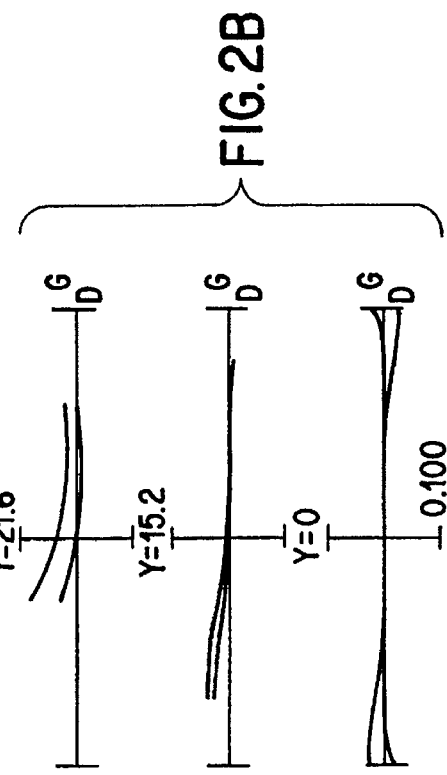
Figure 2C:
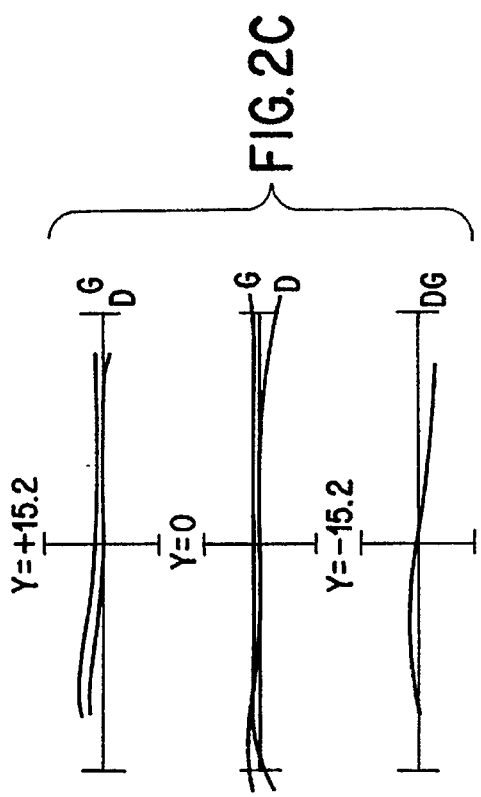

FIGS. 2A–2C respectively show graphs of longitudinal aberrations in the maximum wide-angle state, lateral aberrations without vibration reduction in the maximum wide-angle state and lateral aberrations in the maximum wide-angle state with vibration reduction correction. FIGS. 3A–3C show similar graphs for the maximum telephoto state.

In these graphs, $F_{no}$ denotes the F-number, Y denotes the image height, D denotes the d-line (λ=587.6 nm) and G denotes the g-line (λ=435.6 nm).

Furthermore, in the graphs showing the astigmatism, solid lines indicate sagittal image surface while dotted lines indicate meridional image surfaces.

As can be seen from these graphs, various aberrations are satisfactorily corrected including those under vibration reduction correction.

FIG. 4 shows a zoom lens system according to a second embodiment of the present invention. A first lens group G1 includes a cemented lens having a negative meniscus lens with the convex surface facing the object side and a biconvex lens, and a positive meniscus lens with the convex surface facing the object side. A second lens group G2 includes a negative meniscus lens with the convex surface facing the object side, a cemented lens having a positive meniscus lens with the concave surface facing the object side and a biconcave lens, a cemented lens having a biconcave lens and a positive meniscus lens with the convex surface facing the object side, and a biconcave lens. A third lens group G3 includes a biconvex lens and a cemented lens having a biconvex lens and a negative meniscus lens with a concave surface facing the object side.

A first lens subgroup GL1 includes a positive meniscus lens with the convex surface facing the object side. A second lens subgroup GL2 includes a biconvex lens, a biconcave lens and a negative meniscus lens with the convex surface facing the object side. A third lens subgroup GL3 includes a positive meniscus lens with the concave surface facing the object side and a negative meniscus lens with concave surface facing the object side.

An aperture stop S is provided between the third lens group G3 and the last lens group GL. A flare stop FS is also provided in the last lens group GL.

FIG. 4 shows the positional relationship of each lens group at the maximum wide-angle state. The second lens group G2 and the third lens group G3 move along the optical axis on the zoom path (described by arrows) when zooming to the maximum telephoto state. The first lens group G1 and the last lens group GL are fixed along the optical direction during zooming. The second lens group GL2 is moved by a vibration reduction mechanism 1 in a direction substantially perpendicular to the optical axis to correct variations of the image position caused by vibrations of the zoom lens system.

The second embodiment is also preferably for use with a telephoto zoom lens system.

Table 2 summarizes data values of the second embodiment. In Table 2, f is the focal length, $F_{no}$ is the F-number, 2ω is an angle of view, and Bf is the back focal length. Numerals in the leftmost column represent the order of the lens surfaces from the object side, r denotes the radius of curvature of each lens surface, d denotes spacing of each lens, n(D) denotes the refractive index relative to a d-line ($\lambda$=587.6 nm), n(G) denotes the refractive index relative to a g-line ($\lambda$=435.8 nm) and $\nu$ denotes the Abbe's number with respect to the d-line.

TABLE 2 f = 81.42–196
$F_{no}$ = 2.88–2.90
2$\omega$ = 30.34°–12.14°

| | r | d | $\nu$ | N(D) | n(G) |
|---|---|---|---|---|---|
| 1 | 105.5399 | 2.8000 | 25.50 | 1.804581 | 1.846310 |
| 2 | 73.4058 | 11.4000 | 82.52 | 1.497820 | 1.505265 |
| 3 | –570.0625 | 0.1000 | | | |
| 4 | 118.0775 | 5.7000 | 82.52 | 1.497820 | 1.505265 |
| 5 | 1042.072 | (d5 = variable) | | | |
| 6 | 322.9129 | 2.1000 | 52.30 | 1.748099 | 1.765893 |
| 7 | 122.5766 | 3.8500 | | | |
| 8 | –118.7333 | 3.5000 | 25.50 | 1.804581 | 1.846310 |
| 9 | –61.4330 | 1.6000 | 60.69 | 1.563840 | 1.575310 |
| 10 | 262.6262 | (d10 = variable) | | | |
| 11 | –119.9235 | 1.5000 | 61.09 | 1.589130 | 1.601033 |
| 12 | 42.1223 | 4.5000 | 25.50 | 1.804581 | 1.846310 |
| 13 | 118.0410 | 2.4000 | | | |
| 14 | –181.3955 | 1.8000 | 45.37 | 1.796681 | 1.818801 |
| 15 | 139.1660 | (d15 = variable) | | | |
| 16 | 302.2780 | 3.3000 | 46.42 | 1.582670 | 1.598584 |
| 17 | –143.1747 | 0.1000 | | | |
| 18 | 143.7170 | 6.9000 | 69.98 | : 1.518601 | 1.527667 |
| 19 | –49.9410 | 1.6000 | 25.50 | 1.804581 | 1.846310 |
| 20 | –113.3388 | (d20 = variable) | | | |
| 21 | 35.6047 | 4.5856 | 82.52 | 1.497820 | 1.505265 |
| 22 | 40.1635 | 4.0000 | | | |
| 23 | 49.5891 | 6.8043 | 65.42 | 1.603001 | 1.614372 |
| 24 | –183.9129 | 7.0000 | | | |
| 25 | –91.5083 | 2.0000 | 32.10 | 1.672700 | 1.699894 |
| 26 | 216.2384 | 11.0000 | | | |
| 27 | 40.7254 | 2.2000 | 35.51 | 1.595071 | 1.616844 |
| 28 | 30.6237 | 2.3696 | | | |
| 29 | 71.2512 | 3.0000 | 48.04 | 1.716999 | 1.735734 |
| 30 | 455.0823 | 5.000 | | | |
| 31 | –61.3146 | 3.2887 | 25.50 | 1.804581 | 1.846310 |
| 32 | –44.3935 | 3.1258 | | | |
| 33 | –29.0066 | 3.3761 | 49.45 | 1.772789 | 1.792324 |
| 34 | –44.4133 | (Bf) | | | |

| Variable Interval Upon Zooming | | |
|---|---|---|
| f | 81.42008 | 196.00000 |
| d5 | 1.92399 | 38.14386 |
| d10 | 19.63071 | 19.63071 |
| d15 | 27.22503 | 2.30801 |
| d20 | 18.32023 | 7.01739 |
| Bf | 56.00000 | 56.00000 |

PREFERRED VALUES CORRESPONDING TO EQUATIONS fL=109.5
fl1=472.234
fL2=105.134
fL3=–316.255
RL=455.08230
L=34.3739
f1=125.913
f2=–33.163
f3=92.138
(1) fL2/fL=0.960
(2) fL2/fl1=0.223
(3) $\Delta$SL/fL2=0.00951
(4) RL/fL2=4.329
(5) L/fL=0.314
(6) q+=0.575
(7) q–=0.405
(8) |f2|/f1=0.263
(9) f3/f1=0.732
(10) |fL3|/fL=2.888
(11) N+=1.603001
(12) $\nu$+=65.42

VIBRATION REDUCTION DATA

The maximum displacement amount $\Delta$SL of the vibration reduction second lens subgroup GL2 in the direction perpendicular to the optical axis in the maximum wide-angle state . . . 1.0

Corresponding image movement amount $\Delta$Y in the maximum wide-angle state and the maximum telephoto state . . . +1.0

FIGS. 5A–5C and 6A–6C are graphs similar to FIGS. 2A–2C and 3A–3C showing various aberrations at the maximum wide-angle state and at the maximum telephoto state.

In these graphs, $F_{no}$ denotes the F-number, Y denotes the image height, D denotes the d-line ($\lambda$=587.6 nm) and G denotes the g-line ($\lambda$=435.6 nm).

Furthermore, in the graphs showing the astigmatism, solid lines indicate sagittal image surfaces while dotted lines indicate meridional image surfaces.

As can be seen from these graphs, various aberrations are satisfactorily corrected including those under vibration reduction correction.

Figure 7:
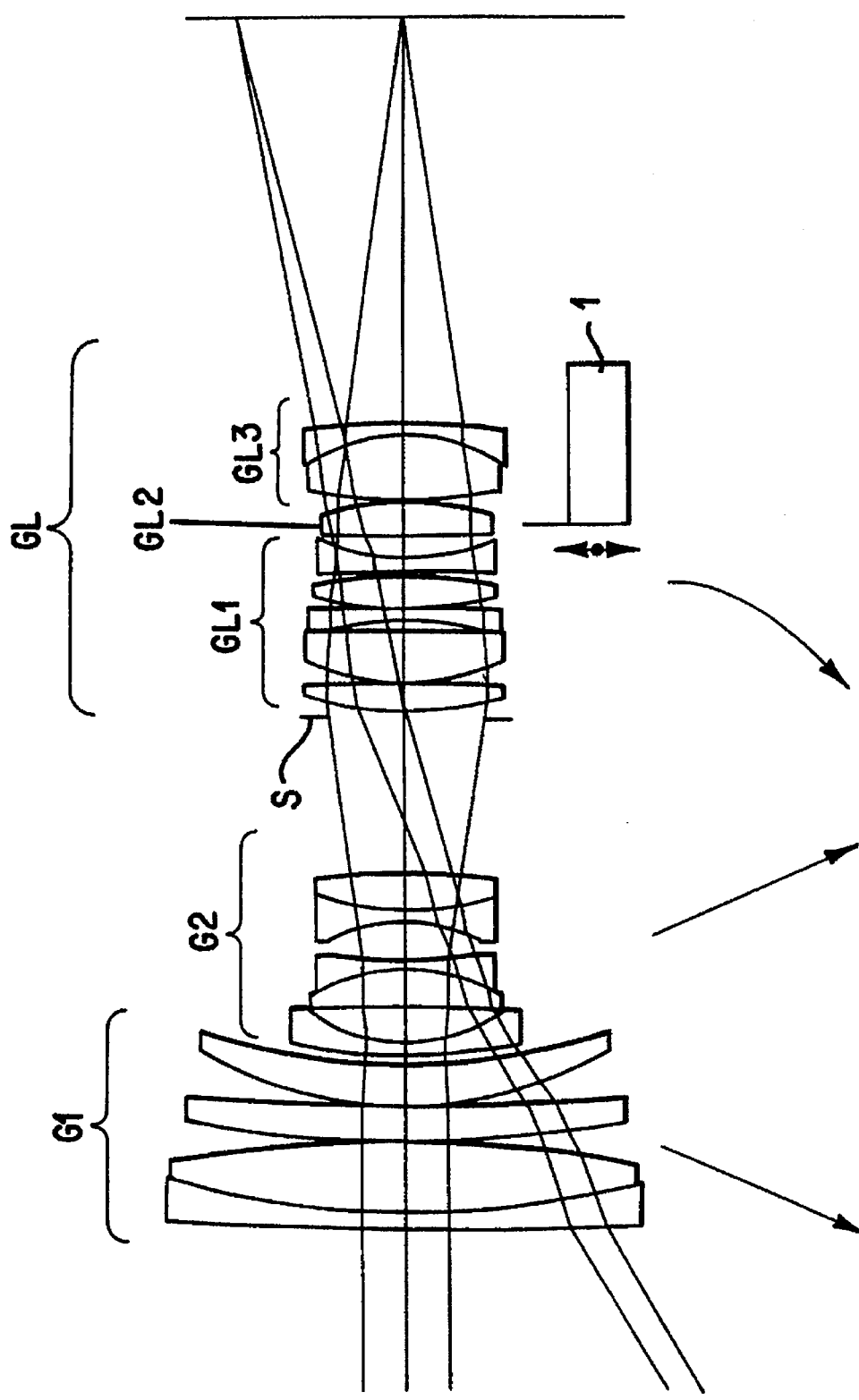
FIG. 7 shows a zoom lens system according to a third embodiment.

FIG. 7 shows a zoom lens system according to a third embodiment of the present invention. A first lens group G1 includes a cemented lens having a negative meniscus lens with the convex surface facing the object side and a biconvex lens, a positive meniscus lens with the convex surface facing the object side, and a positive meniscus lens with the convex surface facing the object side. A second lens group G2 includes a negative meniscus lens with the convex surface facing the object side, a cemented lens having a positive meniscus lens with the concave surface facing the object side and a biconcave lens, a cemented lens having a biconcave lens and a biconvex lens, and a biconcave lens.

A first lens subgroup GL1 includes a biconvex lens, a biconvex lens, a concave lens, a biconvex lens and a biconcave lens. A second lens subgroup GL2 includes a biconcave lens. A third lens subgroup GL3 includes a cemented lens having a biconvex lens and a negative meniscus lens with a concave surface facing the object side.

An aperture stop S is provided between the second lens group G2 and the last lens group GL.

FIG. 7 shows the positional relationship of each lens group at the maximum wide-angle state. The second lens group G2 and the third lens group G3 move on the optical axis along the zoom path (described by arrow) when zooming to the maximum telephoto state. The second lens subgroup GL2 is moved by the vibration reduction mechanism 1 in a direction substantially perpendicular to the optical axis to correct variations of the image position caused by vibrations of the zoom lens system.

The third embodiment is preferably for use on a standard region of a photographic lens.

Table 3 summarizes data values of the third embodiment of the present invention. In Table 3, f is the focal length, $F_{no}$ is the F-number, 2$\omega$ is an angle of view, and Bf is the back focal length. Numerals in the leftmost column represent the order of the lens surfaces from the object side, r denotes the radius of curvature of each lens surface, d denotes spacing of each lens, n(D) denotes the refractive index relative to a d-line ($\lambda$=587.6 nm), n(G) denotes the refractive index relative to a g-line ($\lambda$=435.8 nm) and $\nu$ denotes the Abbe's number with respect to the d-line.

TABLE 3 f = 36.0–102.0
$F_{no}$ = 3.33–3.73
$2\omega$ = 63.8°–23.24°

| | r | d | $\nu$ | N(D) | n(G) |
|---|---|---|---|---|---|
| 1 | 1288.7810 | 1.5000 | 25.35 | 1.805182 | 1.847252 |
| 2 | 116.4400 | 8.9000 | 54.55 | 1.514540 | 1.526319 |
| 3 | –160.5000 | 0.2000 | | | |
| 4 | 184.1970 | 4.0000 | 64.10 | 1.516800 | 1.526703 |
| 5 | 382.7460 | 0.2000 | | | |
| 6 | 54.3630 | 5.0000 | 53.93 | 1.713000 | 1.729417 |
| 7 | 93.0590 | (d7 = variable) | | | |
| 8 | 71.2770 | 1.2000 | 47.47 | 1.787971 | 1.808793 |
| 9 | 21.0570 | 5.0000 | | | |
| 10 | –451.4520 | 4.6000 | 40.90 | 1.796310 | 1.821068 |
| 11 | –21.1960 | 1.0000 | 60.69 | 1.563840 | 1.575310 |
| 12 | 65.8510 | 4.9000 | | | |
| 13 | –17.6630 | 1.0000 | 42.69 | 1.567320 | 1.584250 |
| 14 | 40.6510 | 4.8000 | 28.56 | 1.795040 | 1.831518 |
| 15 | –62.8390 | (d15 = variable) | | | |
| 16 | 50.1390 | 3.4000 | 60.14 | 1.620409 | 1.633173 |
| 17 | –190.2720 | 0.2000 | | | |
| 18 | 28.7210 | 6.1000 | 60.14 | 1.620409 | 1.633173 |
| 19 | –530.3020 | 1.5000 | | | |
| 20 | –46.3000 | 1.2000 | 47.47 | 1.787971 | 1.808793 |
| 21 | 155.0060 | 0.2000 | | | |
| 22 | 48.2840 | 4.5000 | 36.27 | 1.620040 | 1.642085 |
| 23 | –44.8120 | 0.2000 | | | |
| 24 | –171.4250 | 1.3000 | 25.35 | 1.805182 | 1.847252 |
| 25 | 24.7610 | 3.0000 | | | |
| 26 | 164.0620 | 4.1000 | 64.10 | 1.516800 | 1.526703 |
| 27 | –45.5000 | 0.2000 | | | |
| 28 | 55.5420 | 8.6000 | 45.87 | 1.548139 | 1.563282 |
| 29 | –19.7140 | 1.3000 | 40.90 | 1.796310 | 1.821068 |
| 30 | –71.4890 | (Bf) | | | |

| Variable Interval Upon Zooming | | |
|---|---|---|
| f | 36.00010 | 102.02572 |
| d7 | 1.28 | 39.22 |
| d15 | 19.86 | 1.72 |
| Bf | 49.25497 | 67.40116 |

PREFERRED VALUES CORRESPONDING TO EQUATIONS fL=35.483
fl1=64.398
fL2=69.389
fL3=117.439
RL=–45.5
L=4.1
f1=115.5119
f2=–24.471
(1) fL2/fL=1.956
(2) fL2/fl1=1.076
(3) $\Delta$SL/fL2=0.00504
(4) RL/fL2=0.656
(5) L/fL=0.116
(6) q+=–0.566
(8) |f2|/f1=0.212
(10) |fL3|/fL=3.310
(11) N+=1.516800
(12) $\nu$+=64.10

VIBRATION REDUCTION DATA

The maximum displacement amount $\Delta$SL of the vibration reduction second lens subgroup GL2 in the direction perpendicular to the optical axis in the maximum wide-angle state . . . 0.35

Corresponding image movement amount $\Delta$Y in the maximum wide-angle state . . . +0.282

Corresponding image movement amount $\Delta$Y in the maximum telephoto state . . . +0.373

FIGS. 8A–8C and 9A–9C are graphs similar to FIGS. 2A–2C and 3A–3C showing various aberrations at the maximum wide-angle state and at the maximum telephoto state.

In these graphs, $F_{no}$ denotes the F-number, Y denotes the image height, D denotes the d-line ($\lambda$=587.6 nm) and G denotes the g-line ($\lambda$=435.6 nm).

Furthermore, in the graphs showing the astigmatism, solid lines indicate sagittal image surfaces while dotted lines indicate meridional image surfaces.

As can be seen from these graphs, various aberrations are satisfactorily corrected including those under vibration reduction correction.

As described above, the present invention can create a high performance zoom lens system capable of driving the vibration reduction lens group and securing sufficient brightness and back focal length suitable for use in a photographic camera and a video camera.

While the invention has been described in relation to preferred embodiments, many modifications and variations are apparent from the description of the invention. All such modifications and variations are intended to be within the scope of the present invention as defined in the appended claims.

What is claimed is:

1. A zoom lens system having a vibration reduction function, the zoom lens system having a plurality of lens groups positioned along an optical axis from an object side to an image side, the zoom lens system comprising:

first lens group of positive refractive power;

a second lens group of negative refractive power on the image side of the first lens group;

a last lens group of positive refractive power on the image side of the second lens group, said last lens group comprising:

a first lens subgroup of positive refractive power, a second lens subgroup of positive refractive power on the image side of the first lens subgroup, and a third lens subgroup on the image side of the second lens subgroup;

zooming means for increasing an interval between said first lens group and said second lens group and for varying an interval between said second lens group and the last lens group during zooming from a maximum wide-angle state to a maximum telephoto state; and a displacement device that moves said second lens subgroup in a direction substantially perpendicular to the optical axis to prevent vibration caused by movement.

2. The zoom lens system of claim 1, further comprising a third lens group of positive refractive power placed between said second lens group and said last lens group.

3. The zoom lens system of claim 2, wherein a focal length f1 of the first lens group, a focal length f2 of the second lens group and a focal length f3 of the third lens group satisfy:

$0.15 < |f2|/f1 < 0.45,$ and $0.35 < f3/f1 < 1.3.$

4. The zoom lens system of claim 1, wherein a focal length fl1 of said first lens subgroup, a focal length fL2 of said second lens subgroup and a focal length fL of the last lens group satisfy:

$0.2 < fL2/fL < 8,$ and $0.05 < fL2/f1 < 5.0.$

5. The zoom lens system of claim 1, wherein a focal length fL2 of said second lens subgroup, a focal length fL of said last lens group, a magnitude of maximum displacement $\Delta SL$ of said second lens subgroup in the direction substantially perpendicular to the optical axis, a radius of curvature RL of a surface in said second lens subgroup closest to the image side and an axial thickness L of the said second lens subgroup satisfy:

$\Delta SL/fL2 < 0.1,$ $-15.0 < RL/fL2 < 15.0,$ and $L/fL < 0.6.$

6. The zoom lens system of claim 1, wherein a shape factor q+ of a positive lens element in said second lens subgroup closest to the object side and a shape factor q− of a negative lens element in said second lens subgroup closest to the image side satisfy:

$-4.5 < q+ < 5.0,$ and $-4.0 < q- < 5.0.$

7. The zoom lens system of claim 1, further comprising a fixed flare stop provided along the optical axis to shield undesirable light rays when the displacement device moves the second lens subgroup in the direction substantially perpendicular to the optical axis.

8. A zoom lens system having a vibration reduction function, the zoom lens system having a plurality of lens groups spaced along an optical axis from an object side to an image side, the zoom lens system comprising:

a first lens group of positive refractive power;

a second lens group of negative refractive power on the image side of the first lens group;

a last lens group of positive refractive power on the image side of the second lens group, the last lens group including a first lens subgroup of positive refractive power, a second lens subgroup of positive refractive power on the image side of the first lens subgroup and a third lens subgroup on the image side of the second lens subgroup; and vibration reduction means for moving said second lens subgroup in a direction substantially perpendicular to said optical axis.

9. The zoom lens system of claim 8, further comprising zooming means for increasing an interval between the first lens group and the second lens group when zooming from a maximum wide-angle state to a maximum telephoto state, the zooming means further varying an interval between the second lens group and the third lens group when zooming from the maximum wide-angle state to the maximum telephoto state.

10. The zoom lens system of claim 8, further comprising a third lens group of positive refractive power between said second lens group and said last lens group.

11. The zoom lens system of claim 10, wherein a focal length f1 of the first lens group, a focal length f2 of the second lens group and a focal length f3 of the third lens group satisfy:

$0.15 < |f2|/f1 < 0.45,$ and $0.35 < f3/f1 < 1.3.$

12. The zoom lens system of claim 10, further comprising an aperture stop provided between the third lens group and the last lens group.

13. The zoom lens system of claim 8, wherein a focal length fl1 of said first lens subgroup, a focal length fL2 of said second lens subgroup and a focal length fL of the last lens group satisfy:

$0.2 < fL2/fL < 8,$ and $0.05 < fL2/f1 < 5.0.$

14. The zoom lens system of claim 8, wherein a focal length fL2 of said second lens subgroup, a focal length fL of said last lens group, a magnitude of maximum displacement $\Delta SL$ of said second lens subgroup in the direction substantially perpendicular to the optical axis, a radius of curvature RL of a surface in said second lens subgroup closet to the image side and an axial thickness L of the said second lens subgroup satisfy:

$\Delta SL/fL2 < 0.1,$ $-15.0 < RL/fL2 < 15.0,$ and $L/fL < 0.6.$

15. The zoom lens system of claim 8, wherein a shape factor q+ of a positive lens element in said second lens subgroup closest to the object side and a shape factor q− of a negative lens element in said second lens subgroup closest to the image side satisfy:

$-4.5 < q+ < 5.0,$ and $-4.0 < q- < 5.0.$

16. The zoom lens system of claim 8, further comprising a fixed flare stop provided along the optical axis to shield undesirable light rays when the vibration reduction means moves the second lens subgroup in the direction substantially perpendicular to the optical axis.

17. A method for achieving vibration reduction in a zoom lens system having a plurality of lens groups positioned along an optical axis from an object side to an image side, the method comprising the steps of:

providing a first lens group of positive refractive power;

providing a second lens group of negative refractive power on the image side of the first lens group;

providing a last lens group of positive refractive power on the image side of the second lens group, the last lens group including a first lens subgroup, a second lens subgroup on the image side of the first lens subgroup and a third lens subgroup on the image side of the second lens subgroup; and moving the second lens subgroup in a direction substantially perpendicular to the optical axis to achieve vibration reduction.

18. The method of claim 17, wherein the providing steps provide a focal length fL1 of said first lens subgroup, a focal length fL2 of said second lens subgroup and a focal length fL of the last lens group to satisfy:

$$0.2 < fL2/fL < 8,$$

and $$0.05 < fL2/fL1 < 5.0.$$

19. The method of claim 17, wherein the providing steps provide a focal length fL2 of said second lens subgroup, a focal length fL of said last lens group, a magnitude of maximum displacement ΔSL of said second lens subgroup in the direction substantially perpendicular to the optical axis, a radius of curvature RL of a surface in said second lens subgroup closest to the image side and an axial thickness L of the said second lens subgroup to satisfy:

$$\Delta SL/fL2 < 0.1,$$

$$-15.0 < RL/fL2 < 15.0,$$

and $$L/fL < 0.6.$$

20. The method of claim 17, wherein the providing steps provide a shape factor q+ of a positive lens element in said second lens subgroup closest to the object side and a shape factor q− of a negative lens element in said second lens subgroup closest to the image side to satisfy:

$$-4.5 < q+ < 5.0,$$

and $$-4.0 < q- < 5.0.$$

* * * * *